July 24, 1962     A. H. GALANIUK     3,045,431
HYDROKINETIC TORQUE CONVERTER
Filed Jan. 16, 1961
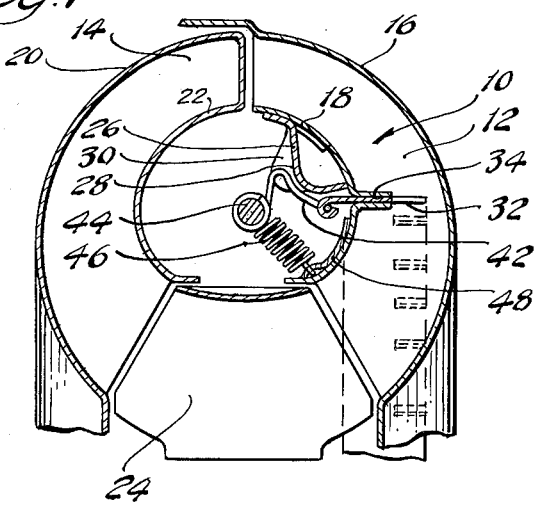
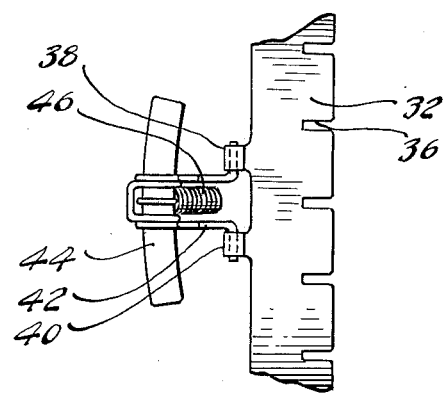
INVENTOR.
ALEXANDER H. GALANIUK
ATTORNEYS.

United States Patent Office 3,045,431
Patented July 24, 1962

3,045,431
HYDROKINETIC TORQUE CONVERTER
Alexander H. Galaniuk, Dormagen, Germany, assignor to Ford Motor Company, Dearborn, Mich., a corporation of Delaware
Filed Jan. 16, 1961, Ser. No. 83,044
3 Claims. (Cl. 60—54)

My invention relates generally to hydrokinetic torque converters and couplings, and more particularly to a means for controlling the toroidal fluid circulation in a hydrokinetic unit.

Hydrokinetic mechanisms of this type are used in automotive vehicle drivelines and include an engine driven pump member and a turbine member that is connected to a turbine torque transfer shaft. The pump torque establishes fluid circulation in a toroidal fluid flow path that is defined at least in part by the pump and turbine members. The fluid enters the turbine member at a radially outward region and it leaves at a radially inward region.

A reduction in the moment of momentum of each particle of fluid is experienced as it travels from the turbine inlet region to the turbine outlet region. The moment of momentum of a particle of fluid at any point in the circuit is defined as the product of the mass of that particle and the tangential component of its absolute velocity multiplied by the radial distance of that particle from the central axis.

When a mechanism of this type is used in a power transmission mechanism for a motor vehicle, the toroidal fluid circulation increases when the vehicle engine throttle opening is increased. The corresponding increase in turbine torque will result in acceleration of the vehicle. Under steady state road load operation, the fluid circulation decreases as the turbine speed approaches the pump speed, but the turbine horsepower is sufficient to meet the road load requirements since the turbine speed is relatively high under these conditions.

When the vehicle is stationary with the engine idling, the toroidal fluid circulation is reduced also, but this is due in this instance to a reduction in engine torque rather than a decrease in the ratio of the speeds of the pump and turbine members.

The reduced pump torque supplied by the idling engine when the speed of the turbine member is zero gives rise to a toroidal fluid circulation that in turn results in a turbine torque of reduced magnitude. This tends to urge the vehicle forward and it is thus necessary to apply the vehicle wheel brakes or to disengage a transmission neutral clutch to prevent the vehicle from creeping.

It is a principal object of my invention to overcome this creeping problem by providing a means for interrupting the toroidal flow during operation of the pump at engine idling speeds thereby eliminating the circulation that gives rise to the reduced turbine creeping torque.

It is a further object of my invention to provide a speed responsive mechanism for interrupting toroidal fluid flow circulation under engine idling conditions and which is automatically rendered inoperative when the pump speed increases in magnitude to a value which is greater than the idling speed.

It is a further object of my invention to provide a mechanism of the type above described and which is actuated by means of centrifugal force acting on a speed responsive portion thereof.

Further objects and advantages of my invention will become apparent from the following description and from the accompanying drawings, wherein:

FIGURE 1 shows a partial cross-sectional view of a hydrokinetic torque converter unit which embodies the improved flow control mechanism of my invention; and, FIGURE 2 is a subassembly view of a portion of the mechanism of FIGURE 1.

Referring first to FIGURE 1, the hydrokinetic torque converter unit is designated by reference character 10 and it includes a pump member 12 and a turbine member 14. These pump and turbine members are disposed in juxtaposed fluid flow relationship and they define a toroidal fluid flow path in known fashion. They are usually comprised of inner and outer shrouds with interposed blade elements, the outer and inner shrouds for the pump member 12 being shown at 16 and 18 respectively, and the outer and inner shrouds for the turbine member 14 being shown at 20 and 22 respectively.

A bladed reactor member 24 is situated between the exit area of the turbine member 14 and the entrance area of the pump member 12. The reactor member 24 can be mounted on a one-way overrunning clutch in known fashion to permit an overrunning motion thereof in the direction of rotation of the turbine member during the coupling range of the converter while inhibiting reverse rotation thereof during the converter torque multiplication range.

The inner pump shroud 18 has secured thereto a ramp 26 which can be secured to the inner shroud by spot welding or by any other suitable fastening method. The ramp 26 comprises a cam surface 28 and a pair of guides 30 that may be formed integrally therewith.

A baffle ring is shown at 32 and it is situated, as shown in FIGURE 1, within the portion of the toroidal fluid flow path defined by the pump member 12. The inner shroud can be formed with an annular slot 34 for slidably receiving the baffle ring 32. The slot 34 is defined in part by guides in the forms of flanges, and the baffle ring 32 is adapted to move axially between these guide flanges. The guide flanges are foreshortened in a tangential direction and are located at widely spaced relative angular positions.

Referring next to FIGURE 2, the baffle ring 32 is formed with peripherally spaced slots 36 for accommodating the pump blades. Cooperating slots are formed in the pump blades to permit the ring 32 to enter the bladed channels of the pump member. The ring 32 is formed also with a pair of eyelets 38 and 40 on the edge opposite the slots 36, and a cam element 42 is received within and carried by the eyelets 38 and 40. The element 42 may be in the form of a wire as indicated, and each of the two ends of the wire are received within a separate one of the eyelets. An intermediate portion of the wire 42 is formed as indicated in FIGURE 1 so that it will cooperate with the cam surface 28.

The wire 42 encircles one or more times a weight 44 that is situated in the region defined by the cooperating inner shrouds 18 and 22 of the pump and turbine members 12 and 14 respectively.

A spring 46, which preferably is of the coil type, is used for normally biasing a weight 44 in a radially inward direction. One end of the spring 46 encircles the weight 44 as indicated, and the other end thereof is received within an eyelet formed by a spring anchor element 48. The element 48 is in turn secured by spot welding or by any other suitable method to the inner shroud 18 of the pump member 12.

When the pump member 12 is rotated, centrifugal force acts on the weight 44 and tends to urge the same in a radially outward direction. This is resisted by spring 46 at relatively low speeds of rotation. Spring 46 is effective to maintain the weight 44 at a relatively inward position and the element 42 is caused to ride along cam surface 28 and to urge the baffle ring 32 in a right-hand direction, as viewed in FIGURE 1, so that it interrupts fluid circulation in the pump member 12. This prevents torque from being developed in turbine member 14 and creeping motion of the vehicle is thus inhibited.

When the engine is accelerated, the centrifugal force acting on weight 44 is urged outwardly against the resistance of spring 46, and cam element 42 will ride along cam surface 28 thereby adjusting the baffle ring 32 in a left-hand direction as viewed in FIGURE 1. The baffle ring 32 is thus removed from the toroidal fluid flow circuit and normal fluid circulation is established. The torque converter will be permitted thereby to function in its usual fashion and the turbine torque that is developed will be transmitted to an associated power transmission gear mechanism to the traction wheels to effect acceleration of the vehicle. The transition from a no-creep condition to an accelerating condition takes place automatically.

Having thus described the principal features of my invention, what I claim and desire to secure by United States Letters Patent is:

1. A hydrokinetic unit comprising a pump member and a turbine member situated in toroidal fluid flow relationship and defining therebetween a toroidal fluid flow circuit, said pump member and said turbine member each comprising an inner shroud and an outer shroud, said inner shrouds defining an annular cavity, a first cam element secured to said inner pump shroud on the interior of said cavity, a second cam element in the form of a wire cooperating with said first cam element in camming relationship, an annular ring carried by said inner pump shroud with the axis thereof coinciding with the axis of said unit, said annular ring being adapted to be adjusted in either axial direction into and out of said circuit, one end of said wire being connected pivotally to said annular ring, a centrifugal weight carried by said second cam element, and spring means for normally urging said weight in a radially inward direction and for normally uring said annular ring within said circuit, said annular ring being urged axially out of said circuit by said camming relationship when said centrifugal weight is moved radially outward under the influence of centrifugal force against the opposing force of said spring means.

2. A hydrokinetic unit comprising a pump member and a turbine member situated in toroidal fluid flow relationship and defining therebetween a toroidal fluid flow circuit, said pump member and said turbine member each comprising an inner shroud and an outer shroud, said inner shrouds defining an annular cavity, a first cam element secured to said inner pump shroud on the interior of said cavity, a second cam element in the form of a wire cooperating with said first cam element in camming relationship, an annular ring carried by said inner pump shroud with the axis thereof coinciding with the axis of said unit, said annular ring being adapted to be adjusted in either axial direction into and out of said circuit, one end of said wire being connected pivotally to said annular ring, a centrifugal weight carried by said second cam element, spring means for normally urging said weight in a radially inward direction and for normally urging said annular ring within said circuit, said annular ring being urged axially out of said circuit by said camming relationship when said centrifugal weight is moved radially outward under the influence of centrifugal force against the opposing force of said spring means, said pump member being formed with a plurality of flow directing blades between said inner and outer pump shrouds, said annular ring being formed with angularly spaced slots, and each of said blades being slotted to accommodate the slots of said annular ring.

3. A hydrokinetic unit comprising a pump member and a turbine member situated in toroidal fluid flow relationship and defining therebetween a toroidal fluid flow circuit, said pump member and said turbine member each comprising an inner shroud and an outer shroud, said inner shrouds defining an annular cavity, a first cam element secured to said inner pump shroud on the exterior of said circuit, a second cam element in the form of a wire cooperating with said first cam element in camming relationship, an annular ring carried by said inner pump shroud with the axis thereof conciding with the axis of said unit, said annular ring being adapted to be adjusted in either axial direction into and out of said circuit, one end of said wire being connected pivotally to said annular ring, a centrifugal weight carried by said second cam element, spring means for normally urging said weight in a radially inward direction and for normally urging said annular ring within said circuit, said annular ring being urged axially out of said circuit by said camming relationship when said centrifugal weight is moved radially outward under the influence of centrifugal force against the opposing force of said spring means, said pump member being formed with a plurality of flow directing blades between said inner and outer pump shrouds, said annular ring being formed with angularly spaced slots, and each of said blades being slotted to accommodate the slots of said annular ring, said first cam element being formed with spaced guides on either side of said second cam element for preventing tangential movement of said second cam element.

References Cited in the file of this patent
UNITED STATES PATENTS

| | | |
|---|---|---|
| 2,358,473 | Patterson | Sept. 19, 1944 |
| 2,862,362 | Parshall | Dec. 2, 1958 |